United States Patent [19]

Kubota et al.

[11] Patent Number: 4,526,658
[45] Date of Patent: Jul. 2, 1985

[54] METHOD FOR IMPROVING RUTHENIUM DECONTAMINATION EFFICIENCY IN NITRIC ACID EVAPORATION TREATMENT

[75] Inventors: Kanya Kubota; Hajimu Yamana; Seiichiro Takeda, all of Ibaraki, Japan

[73] Assignee: Doryokuro Kakunenryo Kaihatsu Jigyodan, Tokyo, Japan

[21] Appl. No.: 550,391

[22] Filed: Nov. 10, 1983

[30] Foreign Application Priority Data

Nov. 15, 1982 [JP] Japan .................. 57-199892

[51] Int. Cl.³ .............................. G21F 9/14
[52] U.S. Cl. ..................... 203/13; 159/47.1; 203/29; 203/32; 252/632; 423/2; 423/22
[58] Field of Search .......... 203/13, 29, 31, 32; 159/47.1; 252/632; 423/2, 22

[56] References Cited

U.S. PATENT DOCUMENTS

| | | |
|---|---|---|
| 3,006,859 | 10/1961 | Allemann et al. ........... 252/632 |
| 3,120,493 | 2/1964 | Clark et al. ................. 252/632 |
| 3,158,577 | 11/1964 | Bray et al. .................. 252/632 |
| 3,673,086 | 6/1972 | Drobnik ...................... 252/632 |
| 3,853,980 | 12/1974 | Berton et al. ................ 423/22 |
| 3,862,296 | 1/1975 | Dotson et al. ............... 252/632 |
| 3,962,114 | 6/1976 | Berreth ....................... 252/632 |

FOREIGN PATENT DOCUMENTS 2609299 9/1977 Fed. Rep. of Germany ...... 252/632
2025686 1/1980 United Kingdom ............... 252/632

OTHER PUBLICATIONS

Kirk-Othmer, *Encyclopedia of Chemical Technology*, vol. 15, Third Edition, (1981), John Wiley & Sons, pp. 855, 856.
Kirk-Othmer, *Encyclopedia of Chemical Technology*, vol. 12, Third Edition, (1981), John Wiley & Sons, p. 741.

*Primary Examiner*—John Doll
*Assistant Examiner*—Wayne A. Langel
*Attorney, Agent, or Firm*—Fleit, Jacobson, Cohn & Price

[57] ABSTRACT

A method for improving ruthenium decontamination efficiency in a nitric acid recovery system in which a nitric acid solution containing ruthenium is subjected to an evaporation treatment in a nitric acid evaporator. The method is characterized by carrying out the evaporation treatment of the nitric acid solution in the presence of hydrazine in a concentration of 20 to 5000 mg per liter of the solution in the evaporator. By the action of hydrazine, the evaporation of ruthenium contained in the solution is suppressed during the evaporation treatment, and hence the ruthenium decontamination efficiency is remarkably improved.

3 Claims, 2 Drawing Figures

METHOD FOR IMPROVING RUTHENIUM DECONTAMINATION EFFICIENCY IN NITRIC ACID EVAPORATION TREATMENT

BACKGROUND OF THE INVENTION

The present invention relates to a method for greatly improving the efficiency of removal or decontamination of radioactive and/or non-radioactive ruthenium (hereinafter simply referred to as ruthenium) present in a nitric acid solution in an acid recovery system where a waste nitric acid solution discharged from, for example, spent nuclear fuel reprocessing facilities is concentrated by evaporation and condensation to recover nitric acid.

In the reprocessing of spent nuclear fuel, chopped nuclear fuel is dissolved in nitric acid. Nitric acid is used also in an extraction stage where each of uranium, plutonium and fission products is mutually separated and purified.

The nitric acid solution which has been used in the dissolving or extraction stages is reused after reducing the radioactivity (i.e. decontamination) and reconverting them into about 10M nitric acid by generating nitric acid vapor by evaporation of the solution and condensing the nitric acid vapor in an acid recovery system. A nitric acid evaporator in which the nitric acid solution is heated to generate nitric acid vapor by evaporation is generally used in such an acid recovery system.

When ruthenium, irrespective of whether it is radioactive or non-radioactive, is contained in the nitric acid solution, it is oxidized during an evaporation treatment to form a volatile compound ($RuO_4$) which is then evaporated and contained in nitric acid vapor. As a result, the concentration of ruthenium in the recovered nitric acid is not well reduced, and the decontamination efficiency of ruthenium in the acid recovery system is lowered.

Thus, there have been proposed various methods wherein sodium nitrite, NOx gas, sucrose or formalin is added in order to improve the decontamination efficiency in the nitric acid evaporator.

However, these methods have the following disadvantages. The addition of sodium nitrite increases salt concentration in a concentrated liquid waste within the evaporator and causes troubles in subsequent steps. NOx gas is hard to handle and requires a difficult addition process. Sucrose and formalin decompose nitric acid, so that there must be provided an apparatus for recovering decomposed nitric acid in a evaporated vapor treatment system.

SUMMARY OF THE INVENTION

An object of the present invention is to provide a method for improving ruthenium decontamination efficiency in the nitric acid evaporation treatment in which the above-described prior art disadvantages are eliminated and the evaporation of ruthenium contained in the nitric acid solution is suppressed during the evaporation treatment, thereby remarkably increasing the ruthenium decontamination efficiency.

Another object of the present invention is to provide a method for improving ruthenium decontamination efficiency in the nitric acid evaporation treatment in which there is no danger and no difficulty in operations in the evaporation treatment and the recovery of nitric acid after the evaporation treatment can be easily carried out.

According to the present invention, there is provided a method for improving ruthenium decontamination efficiency in a nitric acid recovery system in which a nitric acid solution containing ruthenium is subjected to a evaporation treatment in a nitric acid evaporator, characterized in that the evaporation treatment of the nitric acid solution in the evaporator is carried out in the presence of hydrazine in a concentration of 20 to 5000 mg per liter of the solution in the evaporator.

Hydrazine may be added to the nitric acid solution either before or after the solution is introduced into the nitric acid evaporator.

By the function of hydrazine, the evaporation of ruthenium contained in the nitric acid solution is suppressed during the nitric acid evaporation treatment, so that nitric acid vapor not containing ruthenium is produced and the ruthenium decontamination efficiency in the nitric acid evaporator is remarkably increased.

These and other objects and many advantages of the present invention will become apparent from the following detailed description in conjunction with the accompanying drawings.

DETAILED DESCRIPTION OF THE INVENTION

Figure 1:
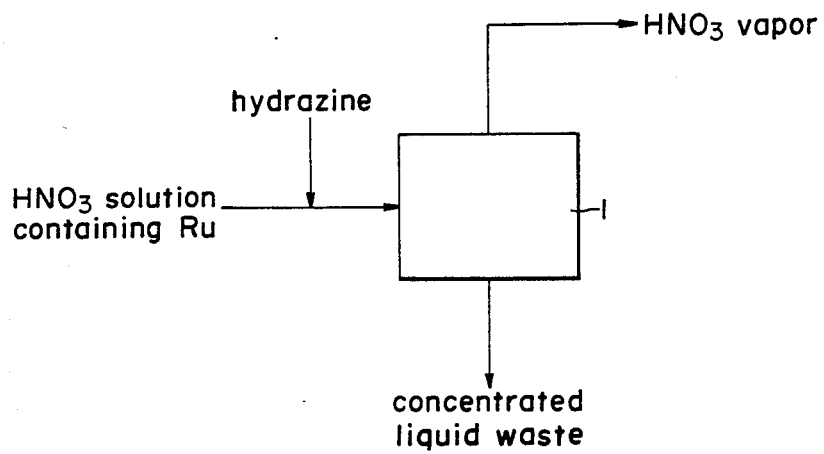
FIG. 1 is a flow diagram showing an embodiment of the present invention.

Referring to FIG. 1, there is illustrated an embodiment of the method of the present invention in which hydrazine is added to a nitric acid solution containing ruthenium and then the solution is fed into a nitric acid evaporator 1 and heated therein to evaporate nitric acid.

Alternatively, hydrazine may be added to the nitric acid solution previously fed into the evaporator 1.

The concentrated liquid within the evaporator affords a high-temperature concentrated liquid containing highly concentrated nitric acid, so that it has a strong oxidative effect to oxidize ruthenium into volatile ruthenium tetroxide ($RuO_4$). As a result, ruthenium is contained in the evaporated nitric acid vapor and the decontamination factor in the nitric acid evaporator is remarkably lowered.

According to the method of the present invention, the added hydrazine rapidly reacts in the high-temperature concentrated liquid containing highly concentrated nitric acid in the following manner, though the detailed mechanism is not yet clarified.

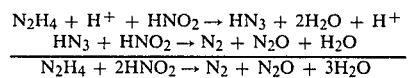

During the course of the reaction, reductive reactions take place between hydrazine or reaction intermediates thereof such as azides and reaction intermediates of ruthenium tetroxide, whereby the oxidation of ruthenium is inhibited. The improvement in the ruthenium decontamination efficiency in the evaporator is considered to be due to this fact.

Figure 2:
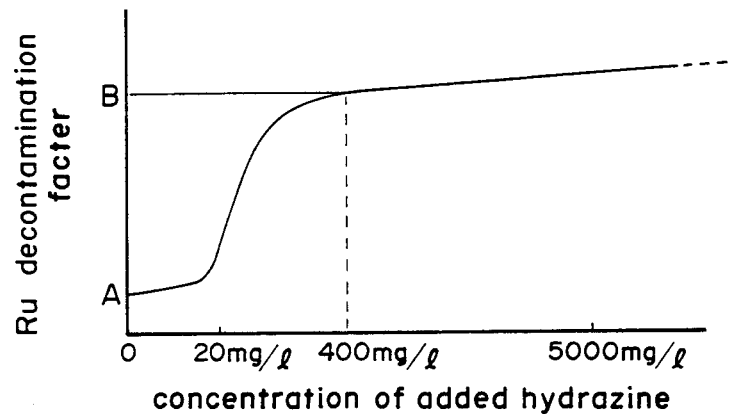
FIG. 2 is a graph showing the relationship between the concentration of added hydrazine and the decontamination factor of ruthenium.

The amount of hydrazine to be added ranges from 20 to 5000 mg, preferably 200 to 2000 mg per liter of the solution within the evaporator. When the amount is less than 20 mg/l, there is practically no effect obtained by the addition of hydrazine, while when it exceeds 20 mg/l, a remarkable effect begins to result. Such an amount will suffice when the method of the present invention is conducted under not so severe conditions. Under somewhat more severe conditions, an amount of 200 mg/l or more is effective. An amount of hydrazine more than 2000 mg/l gives practically no increased effect and has no merits. When the amount of hydrazine to be added exceeds 5000 mg/l, a problem on the accumulation of hydrazine arises unfavorably. Accordingly, hydrazine should be used in an amount of 20 to 5000 mg/l, and an amount of 200 to 2000 mg is particularly preferred. Referring to a graph shown in FIG. 2, the abscissa represents a concentration of added hydrazine per liter of the solution within the evaporator and the ordinate represents a relative value of ruthenium decontamination factor. The experiments show that the ratio of B/A is 40 to 50, wherein A is a decontamination factor when no hydrazine is added and B is a decontamination factor when hydrazine is added in an amount of 400 mg/l. The decontamination factor (DF) is defined by the following equation:

$$\text{Decontamination factor } (DF) = \frac{\text{amount of Ru in solution fed into evaporator}}{\text{amount of Ru in vapor from evaporator}}$$

The following example serves to illustrate a preferred embodiment of the present invention. Example A thermosiphon type reboiler having such a structure that heating is conducted by supplying heating steam to a heat transfer pipe of the reboiler was employed as the nitric acid evaporator. A nitric acid solution (about 2 N) containing ruthenium was fed to the evaporator at a rate of 2 m$^3$/hr. The evaporation treatment was conducted by a continuous operation. The amount of the solution in the evaporator was about 3 m$^3$. Hydrazine was added in an amount of 400 mg per liter of the solution in the evaporator. As a result, the ruthenium decontamination efficiency could be improved about 40 times as much as when hydrazine was not added. The concentrated liquid waste formed by the evaporation was a concentrated nitric acid solution (about 8N) containing ruthenium and other non-volatile substances, and was produced at a rate of 50 to 60 l/hr. Further, it was confirmed that hydrazine rapidly reacted in the high-temperature concentrated liquid containing highly concentrated nitric acid and therefore no danger of its accumulation in the concentrated liquid occurred, that there was no increase in the salt concentration in the concentrated liquid due to the additive and that there was produced no substance making subsequent treatment difficult.

It will be understood from the foregoing description that, according to the method of the present invention as described in detail hereinbefore, the evaporation of ruthenium contained in a nitric acid solution can be suppressed during the evaporation treatment of the nitric acid solution and the ruthenium decontamination efficiency can be remarkably improved. Further, there is no danger and difficulty in the operation in the evaporation treatment, and the recovery of nitric acid after the evaporation treatment can be easily conducted. Therefore, nitric acid solution containing ruthenium discharged from, for example, spent fuel reprocessing facilities or the like can be efficiently decontaminated and nitric acid with a low radioactive concentration can be recovered by using the method of the present invention.

While the invention has been described in its preferred embodiment, it will be obvious to those skilled in the art that various modifications may be made without departing from the scope of the appended claims.

What is claimed is:

1. A method for improving ruthenium decontamination efficiency in a nitric acid recovery system in which a nitric acid solution containing ruthenium is subjected to a evaporation treatment in a nitric acid evaporator, characterized in that said evaporation treatment of the nitric acid solution in said evaporator is carried out in the presence of hydrazine in a concentration of 20 to 5000 mg per liter of the solution in said evaporator.

2. The method according to claim 1, wherein hydrazine is present in said nitric acid solution in a concentration of 400 mg or more per liter of the solution.

3. The method according to claim 1, wherein hydrazine is added to the nitric acid solution containing ruthenium before or after the solution is fed into said evaporator.

* * * * *